US009338181B1

(12) United States Patent
Burns et al.

(10) Patent No.: US 9,338,181 B1
(45) Date of Patent: May 10, 2016

(54) NETWORK SECURITY SYSTEM WITH REMEDIATION BASED ON VALUE OF ATTACKED ASSETS

(71) Applicant: NETFLIX, INC., Los Gatos, CA (US)

(72) Inventors: William D. Burns, Campbell, CA (US); Rob Fry, Morgan Hill, CA (US)

(73) Assignee: Netflix, Inc., Los Gatos, CA (US)

( * ) Notice: Subject to any disclaimer, the term of this patent is extended or adjusted under 35 U.S.C. 154(b) by 58 days.

(21) Appl. No.: 14/198,383

(22) Filed: Mar. 5, 2014

(51) Int. Cl.
*H04L 29/06* (2006.01)

(52) U.S. Cl.
CPC .............. *H04L 63/1433* (2013.01); *H04L 63/14* (2013.01); *H04L 63/1441* (2013.01); *H04L 63/20* (2013.01)

(58) Field of Classification Search
CPC . H04L 63/14; H04L 63/1433; H04L 63/1441; H04L 63/20
USPC ................................................. 726/22, 23, 25
See application file for complete search history.

(56) References Cited

U.S. PATENT DOCUMENTS

| | | | |
|---|---|---|---|
| 6,647,400 B1 * | 11/2003 | Moran | |
| 7,841,008 B1 * | 11/2010 | Cole et al. | 726/25 |
| 2005/0050350 A1 * | 3/2005 | Cain | 713/201 |
| 2006/0010493 A1 * | 1/2006 | Piesco et al. | 726/23 |
| 2007/0169194 A1 * | 7/2007 | Church et al. | 726/23 |
| 2008/0005555 A1 * | 1/2008 | Lotem et al. | 713/150 |
| 2009/0165132 A1 * | 6/2009 | Jain et al. | 726/22 |
| 2010/0037321 A1 * | 2/2010 | Oz et al. | 726/24 |
| 2014/0173739 A1 * | 6/2014 | Ahuja et al. | 726/25 |

* cited by examiner

*Primary Examiner* — Chau Le
*Assistant Examiner* — Gary Lavelle
(74) *Attorney, Agent, or Firm* — Hickman Palermo Becker Bingham LLP (57) ABSTRACT

A data processing method comprising obtaining a plurality of computer network security threat feeds from two or more computer threat detection systems; based upon computer network attack information in the computer network security threat feeds, determining a threat score that represents a severity of an actual or suspected attack on a particular host in a computer network; obtaining an asset value for the particular host that indicates a worth of the particular host, and updating the threat score based upon the asset value; mapping the updated threat score to one of a plurality of remediation actions, wherein a first remediation action is mapped when the updated threat score is low and a second, different remediation action is mapped when the updated threat score is high; based upon the updated threat score and the mapping, selecting and automatically performing one of the plurality of remediation actions on the particular host; wherein the method is performed by one or more special-purpose computing devices.

13 Claims, 6 Drawing Sheets

| Category Weight | 50% | | | | | 25% | | | | | 15% | | | 5% | 5% |
|---|---|---|---|---|---|---|---|---|---|---|---|---|---|---|---|
| | Threat Feeds | | | | | Detectors | | | | | Internal Risk | | | Historical External | Historical Internal |
| | VirusTotal | CrowdStrike | AlienVault | Cymru | | FireEye | Snort | Bit9 | Palo Alto | | Machine Posture | User Posture | Asset Value | Previously Seen? | Previous Alerted |
| Score | 50%-100% | 50%-100% | 50%-100% | 50%-100% | | 25% | 25% | 25% | 25% | | 5%-50% | 5%-25% | 25% | 10% | 5% |
| Target Weight | Positive >=2 | Positive >=2 | Positive >=1 | Positive >=15 | | Alert = malware-callback or malware-object | Severity = 2 or higher | Trust level = 0 or Known bad = true | Depends on return | | Depends on return | Depends on return | Specified high risk asset | Seen = true | Seen = true |

Fig. 6

| Category Weight | 50% | | | | 25% | | | | 15% | | | 5% | 5% |
|---|---|---|---|---|---|---|---|---|---|---|---|---|---|
| | Threat Feeds | | | | Detectors | | | | Internal Risk | | | Historical External | Historical Internal |
| | VirusTotal | CrowdStrike | AlienVault | Cymru | FireEye | Snort | Bit9 | Palo Alto | Machine Posture | User Posture | Asset Value | Previously Seen? | Previous Alerted |
| Score | 50%-100% | 50%-100% | 50%-100% | 50%-100% | 25% | 25% | 25% | 25% | 5%-50% | 5%-25% | 25% | 10% | 5% |
| Target Weight | Positive >=2 | Positive >=2 | Positive >=1 | Positive >=15 | Alert = malware-callback or malware-object | Severity = 2 or higher | Trust level = 0 or Known bad = true | Depends on return | Depends on return | Depends on return | Specified high risk asset | Seen = true | Seen = true |

NETWORK SECURITY SYSTEM WITH REMEDIATION BASED ON VALUE OF ATTACKED ASSETS

FIELD OF THE DISCLOSURE

The present disclosure generally relates to computer-implemented techniques for responding to attacks on computers and other elements of computer networks. The disclosure relates more specifically to computer-implemented techniques for responding to attacks in which a selected response is based upon the nature or value of the attacked asset.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The state of the art in computer security is inefficient, partly due to an inability to integrate information between security tools that are designed to protect networks. Examples of network security tools include malware scanners and threat detectors such as FireEye, Bit9, Palo Alto Networks, and Snort, each of which is either commercially available at the time of this writing or is an available open source project.

The lack of integration usually restricts automation, because individual security tools are isolated to work within their respective silos. Manual, inefficient effort is then required to overcome the lack of integration, and the lack of integration makes it challenging to have visibility into what is happening on network. Consequently, operational teams and security teams may have to use many separate efforts to diagnose, locate and respond to malicious attacks. Therefore, administrators and security personnel are at a disadvantage when attacks occur, typically resulting in slow, disjoined responses and extensive manual effort. For example, it is not uncommon for only a few minutes to elapse from initial attack to initial compromise of an asset, but for days or weeks to pass between the time of discovering the attack and/or compromise until the attack is contained and systems are restored.

Moreover, typical security tools can detect threats well but can recommend only one particular remediation process that does not take into account the complete environment in which an attacked computer is located, the nature of its users, and/or the nature of the attacked computer itself.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The techniques described herein provide an automated method based upon an integrated framework for a plurality of diverse security tools, so that responses to malicious attacks can happen substantially faster than with non-integrated tools. A fully integrated network defense operation is provided using a network security computer having a particular configuration and a network threat detection process having particular steps, in various embodiments. Using these techniques, individual solutions may be orchestrated, and a single view into data assessment and network security is possible. Embodiments are useful in many contexts including but not limited to enterprises that provide services to end users or subscribers through complex networks.

In one approach, input data may be received from multiple different threat detection systems, and the alerts and events that one threat detection system generates may be cross-referenced to the data from another system. Data and alerts may be normalized, but treated as un-trusted and subject to evaluation and validation against other sources.

In an embodiment, a data processing method comprises obtaining a plurality of computer network security threat feeds from two or more computer threat detection systems; based upon computer network attack information in the computer network security threat feeds, determining a threat score that represents a severity of an actual or suspected attack on a particular host in a computer network; obtaining an asset value for the particular host that indicates a worth of the particular host, and updating the threat score based upon the asset value; mapping the updated threat score to one of a plurality of remediation actions, wherein a first remediation action is mapped when the updated threat score is low and a second, different remediation action is mapped when the updated threat score is high; based upon the updated threat score and the mapping, selecting and automatically performing one of the plurality of remediation actions on the particular host; the method is performed by one or more special-purpose computing devices. Other aspects, features and embodiments will become apparent from the following description and the appended claims.

Structural Overview

Figure 1:
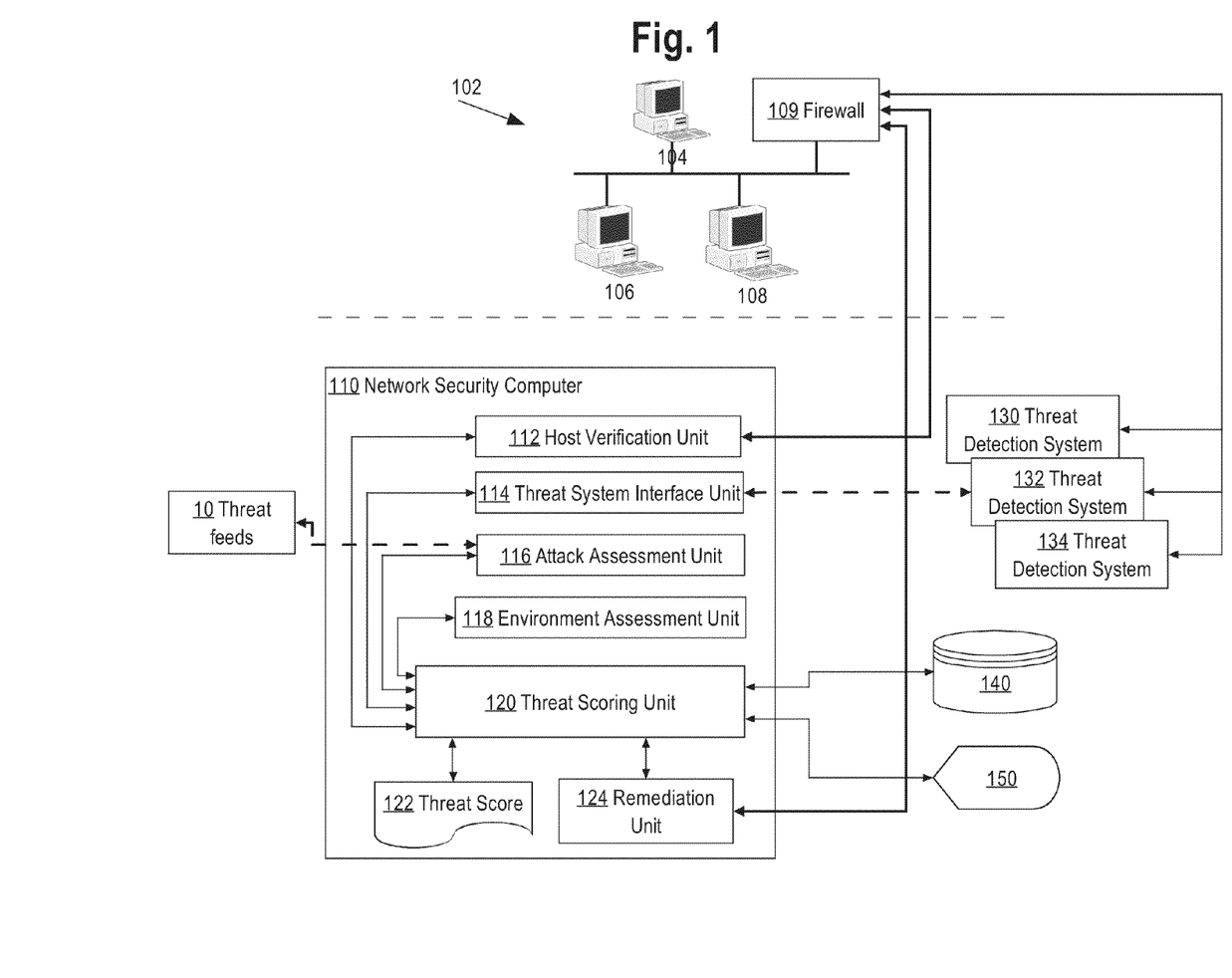
FIG. 1 is a block diagram of one example embodiment of a network security system.

FIG. 1 is a block diagram of one example embodiment of a network security system. In an embodiment, a computer network 102 comprises a plurality of computers 104, 106, 108 and may have a router configured as a firewall 109 to inspect and restrict traffic directed to the network. For purposes of illustrating a clear example, network 102 is illustrated using a small number of computers, but a practical implementation may include any number of computers and/or network infrastructure elements such as routers and switches. The network 102 of FIG. 1 may be termed a "protected network" as it is the subject of protective analysis and remediation provided by other elements of the system.

In an embodiment, a network security computer 110 is coupled directly or indirectly through one or more networks or internetworks to the network 102, such as through a LAN, WAN, public internet, and/or firewall 109. In various embodiments, network security computer 110 may be configured to work within an enterprise with an internal corporate protected network, or with external unprotected networks by additionally using client detectors, SaaS information, or data mining that yields business intelligence. Indeed, the capability to work both internally or externally with respect to a protected network is a distinguishing feature of embodiments in comparison to prior approaches. The particular hardware, software and/or protocols that are used to facilitate networked communication among the network security computer 110 and network 102 are not critical. Network security computer 110 may be implemented using one or more computers, workstations, virtual machine instances, or other computing units with one or more processors, processor cores, or other processing units that execute one or more computer programs or other software elements that are organized as seen in FIG. 1. In other embodiments, as further described for FIG. 4, network security computer 110 may be implemented using digital logic that is configured to execute the functions that are described herein for the functional units of FIG. 1.

In an embodiment, network security computer 110 comprises a host verification unit 112 coupled to a threat scoring unit 120, a threat system interface unit 114 coupled to the threat scoring unit and configured to access data produced by the threat detection systems 130, 132, 134, an attack assessment unit 116 coupled to the threat scoring unit, and an environment assessment unit 118 coupled to the threat scoring unit. Functions of the functional units shown in FIG. 1 for network security computer 110 are described further herein in other sections.

A remediation unit 124 is coupled to the threat scoring unit 120 and is configured to communicate with computers in the network 102. The threat scoring unit 120 is configured to produce a threat score 122.

The threat scoring unit 120 may be coupled to a database 140 of threat information and may generate and cause displaying a user interface or graphical dashboard on a display unit 150 such as a computer display. In an embodiment, data values received from threat detection systems 130, 132, 134 and other sources are stored in database 140 in XML; the database also may include an XML-based configuration file that identifies the name, network location, and method of communicating with threat detection systems 130, 132, 134 and threat feeds 10. In general, threat detection systems 130, 132, 134 typically are located within or associated with the same business enterprise as network security computer 110 and network 102, whereas threat feeds 10 are external and typically associated with third parties. Data from threat feeds 10 is typically the subject of polling, pulling or request messages and represents a one-way inbound data flow, whereas interaction with threat detection systems 130, 132, 134 may be two-way and some such systems permit the network security computer 110 to update them. Data stored in database 140 may be encrypted by calls to a crypto-library. For example, in one embodiment user identifiers, passwords, API keys or other sensitive data may be encrypted using strong encryption, such as AES-256, prior to storage in database 140. Database 140 also may be configured to receive log entries from the network security computer 110 including information about errors, attacks and other information that the network security computer obtained from the threat detection systems 130, 132, 134 and/or the other threat feeds 10.

Database 140 also may store data about assets or machines, users and threats, including an inventor table that identifies known hosts in network 102 and a user table of information about known users of hosts of network 102. For example, the user table may include XML representations of user titles, roles or functions in association with risk values that indicate whether particular user titles, roles or functions are considered higher risk based upon user access to sensitive data or other systems, and/or whether previous security alerts have been associated with the same user. Data about machines may include patch status, previous alerts for the same machine, host verification information, whether particular software (e.g., anti-virus or application whitelisting) is installed on the host, etc. Threat data may include whether a particular hash value from an external system has been seen before, and/or whether a particular IP address of an attacker or malicious URL has been seen before.

A plurality of threat detection systems 130, 132, 134 may be coupled to the network 102. In an embodiment, network security computer 110 is configured to query, poll or receive posts or messages from the threat detection systems 130, 132, 134 relating to threats that have been detected in relation to the network 102 or particular computers 104, 106, 108 in the network. For purposes of illustrating a clear example, FIG. 1 shows three (3) threat detection systems 130, 132, 134, but various embodiments may have one, two, or any other number of threat detection systems. Each of the threat detection systems 130, 132, 134 may comprise, in one embodiment, a different commercially available threat detection system may be configured to detect viruses, malware, denial of service (DoS) attacks, or other threats. Examples of threat detection systems that are commercially available or in open source distribution include those from FireEye, Snort, Bro, Bit9, Palo Alto Networks, Sophos, etc.

In an embodiment, the host verification unit 112 is configured to determine whether a host such as a particular computer 104, 106, 108 in the network 102 is a verified computer. "Verified," in this context, means that the subject computer has undergone a series of testing and configuration steps that provide a level of confidence with respect to the security software that is installed on that subject computer. For example, a verified computer may be one that is known to have anti-virus software installed of a particular type and with a particular set of updates, and that has been recently scanned to confirm the absence of malware or viruses. Verification also could include determining that required software patches for an operating system or applications have been installed. Data indicating that particular computers are verified may be stored in tables in database 140 and the host verification unit 112 may determine whether a host is verified by sending a query to the database. In some cases, unverified hosts may be treated differently than verified hosts; for example, the automated remediation techniques described herein might be applied only to verified hosts.

In an embodiment, the threat system interface unit 114 is configured to query, poll, or otherwise access data produced by the threat detection systems 130, 132, 134 to obtain information about attacks that the threat detection systems have identified for one or more of the computers 104, 106, 108. The threat system interface unit 114 may obtain attack information from the threat detection systems 130, 132, 134 using messages or requests in any suitable protocol or may communicate function calls according to an API associated with one or more of the threat detection systems. The attack information may indicate the type of attack, expected attacker, date and time, and related data.

In an embodiment, the attack assessment unit 116 is configured to obtain external information, if available, about an attacker that has been identified via the threat system interface unit 114. The external information may include, in one embodiment, an indication of a number of other threat feeds 10, different from the threat detection systems 130, 132, 134, which issued alerts as a result of a particular attack of interest. There may be any number of other threat feeds 10 accessible to the network security computer 110. Commercially available or publicly available examples of the other threat feeds 10 include detectors from Virus Total, Team Cymru, CrowdStrike, AlienVault, ShadowServer, ScoutVision, Quttera, Neutrino, etc. The indication that is obtained as part of the external information may indicate that zero to N of the other threat feeds 10 issued an alert or detected the attack, where N is the number of other detectors.

The attack assessment unit 116 may be configured with logic capable of polling, calling, or sending messages to the other threat feeds 10 based upon APIs or messaging protocols that the other detectors implement. For example, in the case of Bit9, the attack assessment unit 116 may be configured to request new hash values generated in the threat system in the past 60 seconds and to provide the hash values to one of the threat detection systems 130 via interface unit 114; if the threat detection systems identify malicious indications in the hash values, then the hash values may be subjected to scoring. The attack assessment unit 116 may be configured to get, from the other threat feeds 10, machine-specific information for a particular asset such as where a malicious file is located and whether the file is executable and/or has been executed.

In an embodiment, the environment assessment unit 118 is configured to obtain information about the host in network 102 that is the subject of the attack, the nature of the user, and posture information about the host and/or user and/or attacker. Machine posture data may be formed as a combination of values obtained from the host, values from penetration testing services such as Metasploit, an external vulnerability scan, patch installation data, anti-virus systems and others. In one specific embodiment, environment assessment unit 118 is configured to obtain data indicating a value of the host, or a role of the host if the role implies a value. For example, in one approach in which network 102 is associated with a service provider that services a large number of consumer customers, hosts that are associated with customer service representatives may have different values than computers that are associated with company executives. Posture data may come from a directory repository such as Microsoft Active Directory or other system management tools. The nature of the user and/or the posture data may suggest whether a particular user is more likely to be a target, or has access to critical data, or some other trigger factor that should cause threat scoring unit 120 to determine that an alert for that user should be considered more severe than for other users. Attacker posture data may be obtained from threat detection systems 130, 132, 134.

The threat scoring unit 120 is configured to determine the threat score 122 for a particular one or more of the computers 104, 106, 108 based upon attack data and other information obtained from functional units 112, 114, 116, 118. In an embodiment, data obtained from each of the functional units may be assigned a different weight and blended based upon the combined data and weights to result in a final value for the threat score 122, as further described herein. In one embodiment, the threat scoring unit 120 is configured to map the threat score 122 to one or more remediation steps or processes.

In an embodiment, the remediation unit 124 is configured to receive instructions from the threat scoring unit 120 indicating a particular one or more remediation steps to execute on one or more of the computers 104, 106, 108. In the example of FIG. 1, remediation unit 124 is shown as coupled to firewall 109 for the purpose of implementing remediation operations in the protected network 102. However, remediation may involve multiple different tools, systems or techniques at the client layer and/or including external systems such as Active Directory or the network layer. Thus, the connection between remediation unit 124 and firewall 109 broadly represents any and all such approaches for remediation of issues in the protected network.

Network security computer 110 optionally also may include a web front-end unit that is configured to generate HTML documents for display on display unit 150 using a browser or for communication to other systems that have browsers. Network security computer 110 also may include a configuration front-end, such as an HTML-based application that can receive configuration data and modify operations of one or more of the functional units shown in FIG. 1 based on the configuration data.

Functional Overview

Figure 2:
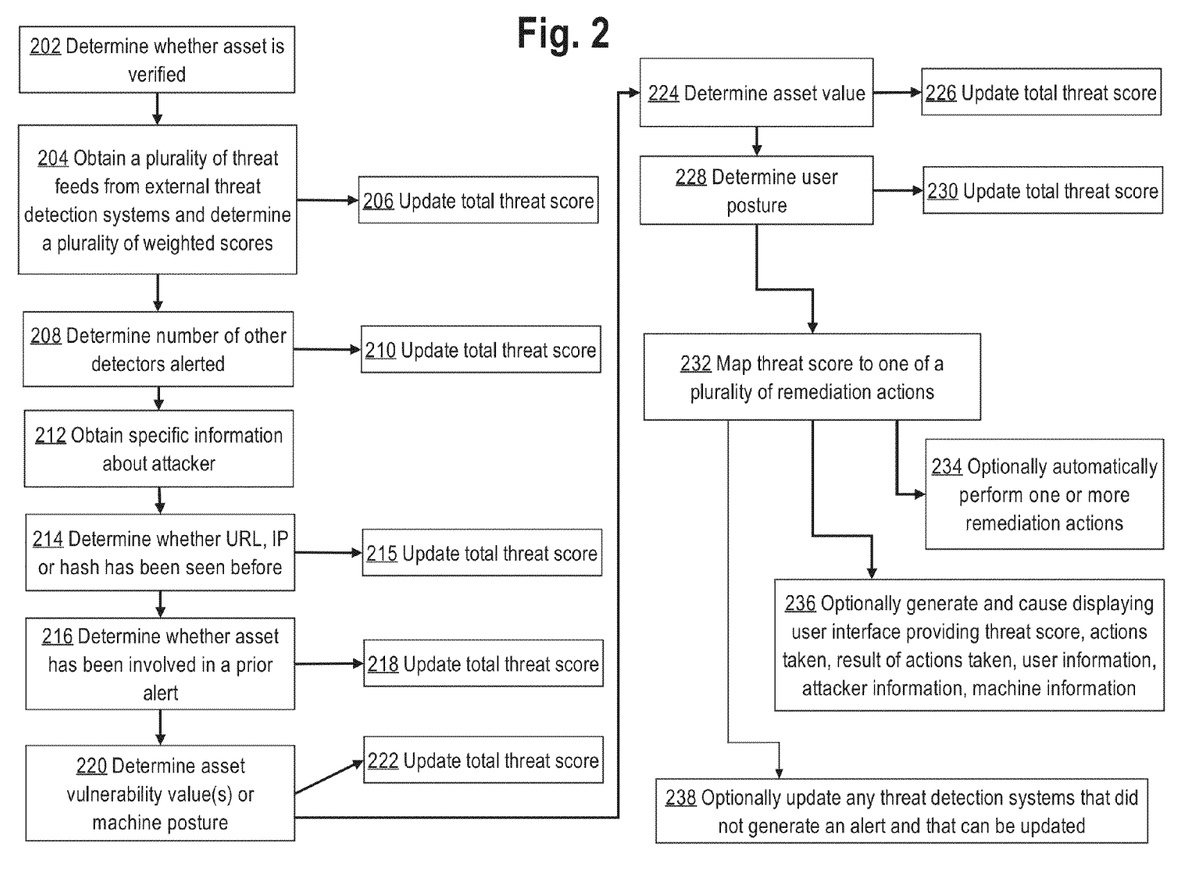
FIG. 2 is a process diagram of an example computer-implemented process of remediation for network attacks that is based in part upon a value of an attacked asset.

FIG. 2 is a process diagram of an example computer-implemented process of remediation for network attacks that is based in part upon a value of an attacked asset. In an embodiment, FIG. 2 may be implemented using digital computer logic, one or more computer programs, and/or one or more other software elements that are executed using one or more processors and organized as threat scoring unit 120 and the other functional units as shown in FIG. 1. Further, in one embodiment, the process of FIG. 2 typically is executed for a particular host or computer among those shown in network 102, in response to receiving data indicating that a new host or computer has appeared in the network, from a discovery system such as MetaSploit/Nexpose, NMAP, etc. For example, network security computer 110 may include a host discovery unit that is configured to use the APIs of the foregoing systems to scan for new hosts in network 102, to use external applications such as NMAP as a source of information about hosts, to use Secure Shell (SSH) or Remote Procedure Call (RPC) to contact hosts to determine if the hosts are managed, etc. The discovery unit may maintain an inventory table in database 140 that identifies all known hosts based upon unique identifiers such as Media Access Control (MAC) addresses.

In some cases, the process of FIG. 2 may be initiated in response to an alert on a host from one of the threat detection systems 130, 132, 134 or other threat feeds 10. The process of FIG. 2 may be repeated during a specified period of time that is indicated in a counter value stored in database 140 in association with data about the host.

At step 202, the process determines whether a particular asset is verified. Verification, in this context, means that the asset previously has been inspected or certified by an information technology professional or system and has been determined to contain a proper security configuration such as specific anti-virus or anti-malware software. Determining whether a particular asset is verified may comprise issuing a query to database 140 based upon a host identifier such as a MAC address.

At step 204, the process obtains a plurality of threat feed data from external threat detection systems and determines a plurality of weighted scores. At step 206, a total threat score is updated based on the plurality of weighted scores.

At step 208, the process determines a number of other detectors that alerted as a result of the same attack. For example, attack assessment unit 116 determines which number of the other threat feeds 10 issued an alert or otherwise detected a particular attack. In response, at step 210, the total threat score is updated based upon the number of other detectors that signaled an attack.

At step 212, the process obtains specific information about an attacker identified as part of the attack, typically from one or more external systems. Examples of other external systems are those previously described for threat feeds 10 (FIG. 1). The threat scoring unit 120 may implement code the perform lookups based upon a destination address of a packet or any other information in a packet or otherwise known about an attacker.

At step 214, the process determines whether a URL, IP address, or hash value associated with the attack has been seen before. In response, at step 215, the total threat score is updated based upon whether one of the values has been seen before.

At step 216, the process determines whether a particular asset has been involved in a prior attack alert. In one approach, each asset is identified using a static network address or, if dynamic network addressing is used via DHCP or a similar protocol, then an asset may be uniquely identified based upon a machine identifier such as a MAC address. The identifier of an asset is used in a query to database 140 that requests data about the particular asset, and a table of assets in the database may include rows for assets and columns with values or markers indicating the involvement of an associated asset in a prior attack. If a particular asset has been involved in a prior attack alert, then the total threat score may be updated as indicated in step 218.

At step 220, the process determines one or more asset vulnerability values associated with the particular asset and updates the total threat score at step 222 in response. An asset vulnerability value may indicate a particular level of vulnerability to attack for a specific asset. For example, computers in network 102 that are involved in receiving files from the public internet may have a higher level of vulnerability, whereas computers that are secured behind multiple firewalls or that host sophisticated threat mitigation software may have a lower level of vulnerability. Data indicating levels of vulnerability may be stored in database 140 in records for assets.

At step 224, the process determines a value of a particular asset and updates the total threat score at step 226 in response to the value that is determined. "Value," in this context, indicates the worth of the asset in terms of importance to an enterprise or environment in which the asset is used. For example, an application server computer that provides core customer service functions for a particular business enterprise typically is denoted as a high-value asset, whereas a computer that is used by a customer service representative having relatively constrained responsibilities and access to less sensitive data may be denoted as a lower-value asset. In an embodiment, the database 140 stores value data of the foregoing type for each of the computers 104, 106, 108 in the protected network 102. Therefore, at step 224, it is possible for the process to determine a value of a particular asset by an appropriate query to the database 140.

At step 228, the process determines a security posture of a particular user of the particular asset and updates the total threat score at step 230 in response to the posture that is determined. As a result, the total threat score reflects individual scores for the threat, machine, and user. TABLE 1 illustrates an example configuration of the threat scoring unit 120, or the process steps of FIG. 2, to obtain data value from a plurality of source systems and to produce a combined threat score as a result. In some embodiments, the contribution to the total score of a particular group of contributors, such as the threat feeds 10, may be weighted downwardly using a functional unit at a higher logical layer; modified weighting of this type may be appropriate for enterprises which, for budget reasons or due to other resource constraints, use one or a small number of threat feeds and therefore wish to give them less weight in comparison to the internal threat detection systems 130, 132, 134.

TABLE 1

CONTRIBUTION OF DATA FROM SYSTEMS TO THREAT SCORE

| Issue, Function, System | Definition | Contribution to Total Score (Weighted Score) | Target Criteria | Notes |
| --- | --- | --- | --- | --- |
| Host verified? | Check to see if host has been verified; treat unverified systems with less automation | N/A | | |
| Virus Total | Threat Feed | 50%-100% of total. (Or a smaller fraction based upon earlier weighting, e.g., when the enterprise uses relatively few threat feeds or deems the threat detection systems as more authoritative) | Positive return >=2 | If hash return ! = Trojan then lower severity; each positive return is 5%. If hash return = Trojan then raise severity; each positive return is 50%. |

TABLE 1-continued

CONTRIBUTION OF DATA FROM SYSTEMS TO THREAT SCORE

| Issue, Function, System | Definition | Contribution to Total Score (Weighted Score) | Target Criteria | Notes |
| --- | --- | --- | --- | --- |
| ShadowServer | Threat Feed | 50%-100% of total. (Or a smaller fraction based upon earlier weighting, e.g., when the enterprise uses relatively few threat feeds or deems the threat detection systems as more authoritative) | Positive return $>=2$ | If hash return ! = Trojan then lower severity; each positive return is 5%. If hash return = Trojan then raise severity; each positive return is 50%. |
| Alien Vault | Threat Feed | 50%-100% of total. (Or a smaller fraction based upon earlier weighting, e.g., when the enterprise uses relatively few threat feeds or deems the threat detection systems as more authoritative) | Positive return $>=1$ | If IP = other, then lower severity. Each positive return is 5%. If IP = malware host, malware distribution, malware domain, malware IP, or C&C, then raise severity. A positive return equals 50%. |
| Cymru | Threat Feed | 50%-100% of total . (Or a smaller fraction based upon earlier weighting, e.g., when the enterprise uses relatively few threat feeds or deems the threat detection systems as more authoritative) | Positive return $>=2$ | If hash return ! = Trojan then lower severity; each positive return is 5%. If hash return = Trojan then raise severity; each positive return is 50%. |
| Detectors | How many other detectors alerted? | Add 5% to 20% per detector | If the detector categorizes alerts, then increase the threat score based on each detector alert. | |
| Attacker Information | Gather specific information about the attacker. (Example: determine that an IP address is in China) | 0%. (Or a different value based upon earlier weighting, e.g., when the enterprise uses relatively few threat feeds or deems the threat detection systems as more authoritative) | UATT | |
| URL, IP, hash value seen before? | Obtain historical data and test. | 10% of total | Seen = true | |
| Previous alerts (Has the host or user been involved in a previous alert)? | Obtain historical data and test. | 5% of total | Alerts = true | |

TABLE 1-continued

CONTRIBUTION OF DATA FROM SYSTEMS TO THREAT SCORE

| Issue, Function, System | Definition | Contribution to Total Score (Weighted Score) | Target Criteria | Notes |
|---|---|---|---|---|
| Machine vulnerability | Obtain data from AV, Bit9, patch status, location, function of host. | 5% to 50% of total. | Depends on return valueHo st-based security controls installed (=+50%), installed but not recently updated (=+10%), host has critical patches not installed are >5 = 20%; host has high-impact patches not installed >10 = 5% | |
| Asset value | Determine type, worth or other risk value of asset. | | | Sensitive data true = 25% |
| User Posture | Obtain title, role or function of user | 5% to 25% of total | Depends on return | Executives, executive assistants, directors, users with privileged access such as system administrators, CS = 25% |

Figure 5:
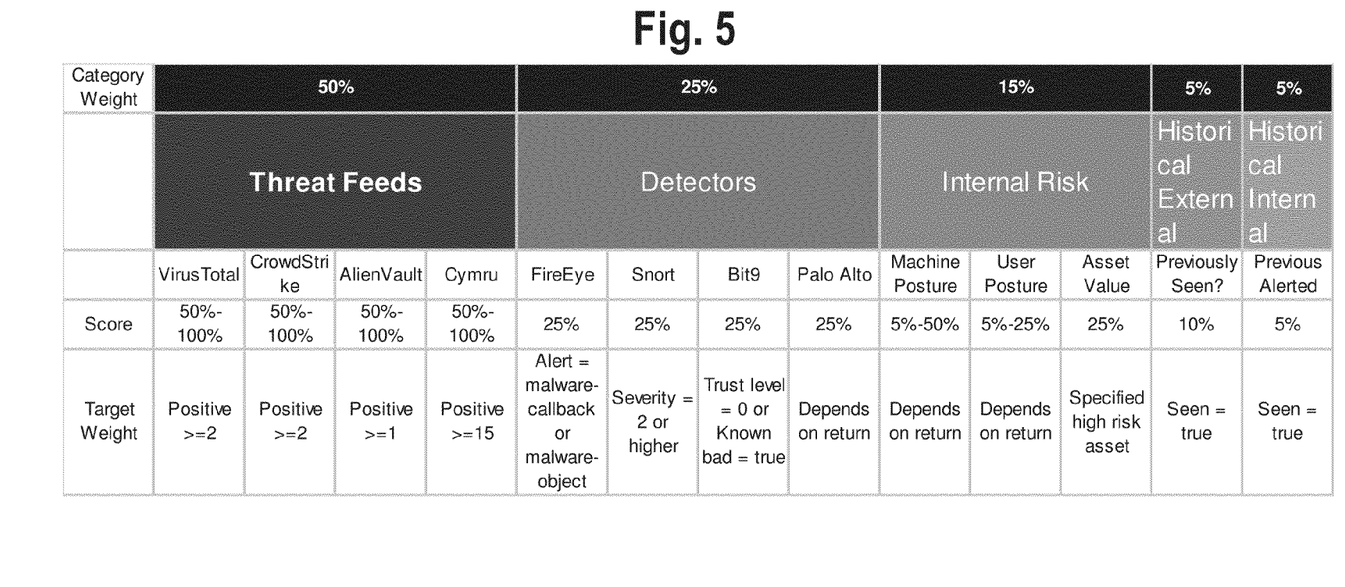
FIG. 5 and FIG. 6 illustrate example associations of categories, attributes of the categories, scores and weights that could be used in two different embodiments or implementations, or with respect to the networks of two different enterprises or companies.
Figure 6:
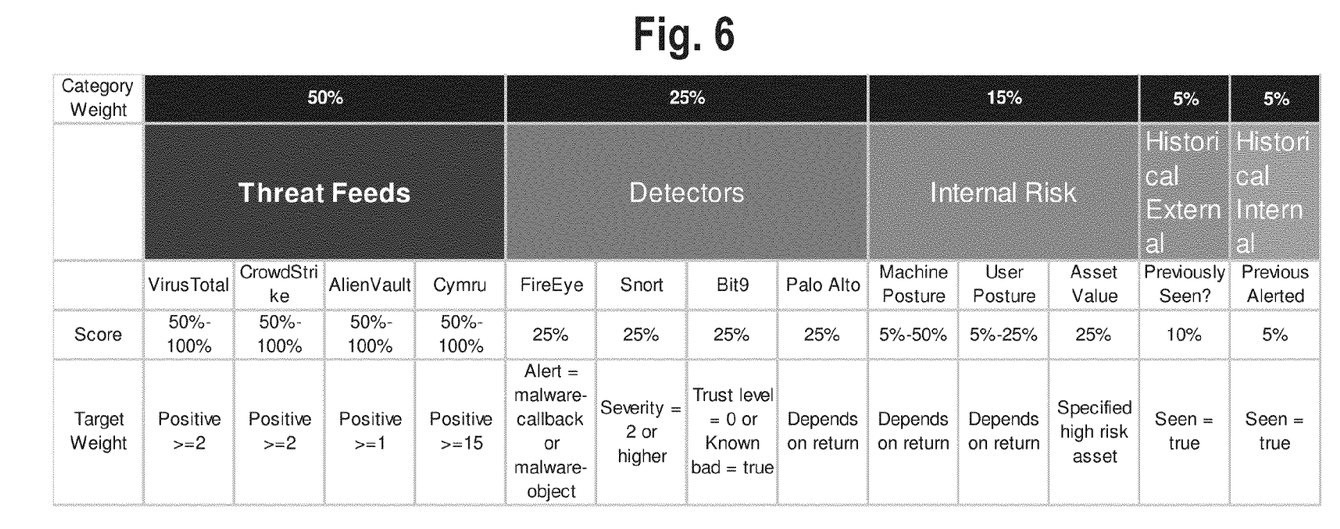

The example of FIG. 1 includes ranges of weights, scores and criteria that may be customized across all categories based upon configuration data that is stored in the database and associated with each enterprise or company. Additionally, within each higher level, an optional category weight may be specified to more precisely score the system based upon resources or risk that are within or particular to each enterprise or company. For example, "threat feeds" may comprise a first category that is made up of each available feed (such as Virus Total, Cymru, Alien Vault in TABLE 1), and machine/user/asset may comprise a second category. "Detectors" may comprise a category that is based upon the total number of detectors that a company would use, and each detector would have its own score or weight with a global weight that is assigned to the category. FIG. 5 and FIG. 6 illustrate example associations of categories, attributes of the categories, scores and weights that could be used in two different embodiments or implementations, or with respect to the networks of two different enterprises or companies.

At step 232, the process maps the resulting total threat score value to one of a plurality of available enforcement or remediation actions. Examples of enforcement or remediation actions include: disable network interface card (NIC) of the asset; set a trust level for the asset in database 140, and in other systems, to zero; isolate or quarantine the asset by modifying configuration of firewalls or routers; automatically initiating a software reimaging operation on the asset to replace its operating system, applications and configuration data; initiating the use of a remediation package that may include one or more bug fixes, patches, upgrades or updates; disabling a virtual private network (VPN) tunnel, configuration, or client program on the affected asset; revoking a DHCP lease of an IP address to the affected asset by communicating DHCP protocol messages to the DHCP server(s) that the asset can use; calling an API call of the DHCP server to blacklist an unknown or malicious MAC address so that a machine with the MAC address will not be granted an IP address lease in the future; performing a PXE boot scan; deleting, on the host, executable files that triggered an alert but have not been executed by the host.

Enforcement or remediation actions may involve automatic communication between network security computer 110 and external systems. For example, JAMF may be used to implement disabling host NIC units on demand using scripts. Landesk may be used to implement reimaging on-demand for hosts with compatible images, to implement disabling NIC units on demand using either scripts or automation, and/or inventory functions such as retrieving host inventory data that is held in the Landesk data repository and retrieving data about anti-virus versions that have been installed on hosts that the Landesk system is managing. As another example, an LDAP repository, user directory and/or user provisioning systems such as Microsoft Active Directory may be queried to gather user information based upon a user name associated in database 140 with a host. Additional or alternatively, Active Directory may be used in mitigation operations such as forcing password resets and disabling accounts. In one embodiment, Active Directory may be queried for existing binding data relating to a particular network 102 and the binding information may be stored in XML format in database 140. As still another example, Bit9 may be used as an additional data source for a host and for information on files that are suspects to be malicious. As yet another example, a log and event aggregation system such as the Sumo Logic system may be used to locate a user or IP address that is connected to a VPN as a predicate to removing the user or host from the VPN. The Sumo Logic system also is usable during host detection. As an example, assume that a detector 10 such as Snort generates an alert when a malicious DNS lookup occurs. The source IP address in such an alert indicates a DNS server, but not the attacker. Therefore, a query to the Sumo Logic repository may be performed to obtain the DNS query that was originally used and the true source IP in that query, which will be associated with the attacker.

An example mapping of threat score values to possible remediation actions is set forth in TABLE 2:W

TABLE 2

MAPPING OF THREAT SCORES

| Total Threat Score | Remediation/Action | Definition |
| --- | --- | --- |
| 0%-20% | No user action required. System remediated through automation.. | Notification to incident response staff |
| 20%-30% | System reboot needed. | System performed a remediation operation but rebooting the host is required to implement the operation. |
| 30%-80% | Scan and release. | Severity is not critical, but machine should be taken offline and scanned; if nothing is found, then release back to the user. |
| 81%-89% | Scan, patch and release. | Severity is not critical. Scan and release is required. System also needs patches. |
| 0%-80% | Previously alerted. | System is still infected after prior alert, or the user is high risk. Perform reimaging. Perform user training. |
| 90%-100% | Reimage. | Severity gathered from all systems is high, and system needs to be rebuilt. In some cases where the asset value is high, reimaging is performed for all alerts regardless of severity. |

At step 234, the process optionally automatically performs one or more of the enforcement or remediation actions based upon the mapping that occurred at step 232.

At step 236, optionally the process generates and causes displaying a user interface providing the final threat score value, actions taken, results of actions taken, user information, attacker information, and/or machine information. Additionally, step 234 or step 236 may include generating one or more notifications to other systems, such as one or more recommendations for enforcement or remediation, generating a hyperlink to a URL with customized detailed information about how to remediate the system based on user-defined actions, generating a list of actions performed, creating a ticket in a trouble ticket system, updating the database 140, etc. Notifications may be communicated, for example, using e-mail messages that are formed based upon an alert template. In one embodiment, a basic alert template may receive high-level descriptions of actions taken by the system and recommended actions, and a detailed alert template may provide more verbose information with one or more links to details of an attack or remediation information.

At step 238, optionally the process updates one or more of the threat detection systems 130, 132, 134 that did not generate an alert for the subject attack, and that are capable of updating. For example, some but not all of the threat detection systems may offer an API that the process can call for the purpose of updating local databases of the threat detection systems to identify an attack vector, attacker, or provide additional context data for the attack.

Figure 3:
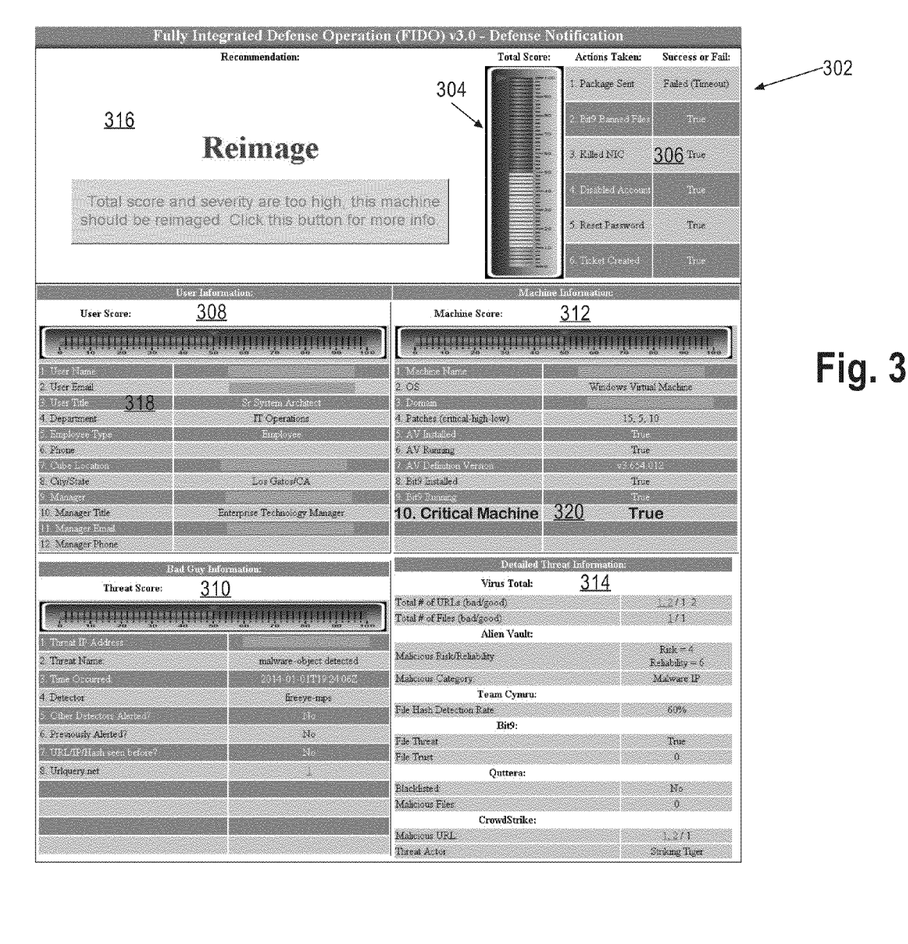
FIG. 3 illustrates an example graphical user interface that may be provided in an embodiment.

FIG. 3 illustrates an example graphical user interface that may be provided in an embodiment. In one embodiment, the threat scoring unit 120 may be configured to generate and display a screen display 302 in the form of an HTML document for display using a browser on display unit 105. In an embodiment, screen display 302 comprises a threat score indicator 304, actions table 306, user table 308, attack table 310, machine table 312, map 314, and recommendation region 316. Other embodiments may include more or less data and/or may present the data in different arrangements, orientations or formats.

In one embodiment, the threat score indicator 304 indicates a total threat score associated with a combination of an attack, a user, an attacker, and a machine. Typically the threat score is expressed as a numeric value, such as a value from 0 to 100. The threat score indicator 304 may be graphically depicted as a gauge, dial, set of numeric characters, set of alphanumeric characters, or any other useful format.

In an embodiment, the actions table 306 specifies one or more actions, such as remediation actions, that the system has performed and the result of each of the actions. Examples in FIG. 3 include: application whitelist violation banned files: True; Package sent: Failed; disabled NIC: True; Disable Account: True; Password Reset: True; Ticket Created: True. This combination of values indicates that the application whitelist violation system on the host was used to ban execution of specified executable files; the system attempted but failed to send a package of software updates or patches to the host; the system successfully disabled the network interface of the host to prevent other network access; the system successfully disabled an account of the user or machine; the system successfully reset the user's password; and the system successfully created a trouble ticket in a trouble ticket management system. Other embodiments may use one or more other options, such as enforcing additional authentication methods at the next user login operation.

In an embodiment, the user table 308 indicates data about the user of the host that is in database 140 or that has been obtained from other systems. Example information includes a user posture score, user name, user email, user title, department, employee type, phone, cube or office location, city and state of office, manager, manager title, manager email, manager phone. Individually or collectively, one or more data values in user table 308 may represent user value or criticality information. For example, the user title, department, and employee type values may individually or collectively indicate a level of importance of the user and/or a likelihood that the user can access sensitive data and/or a likelihood that the user will be a target of an attack. Values in user table 308 indicating higher risk for a user may influence the type of remediation actions that are taken in response to an attack and may influence the total threat score shown in threat score indicator 304.

In an embodiment, the attack table 310 comprises data about an attack or an attacker that has been detected. Example information includes a threat feed score from an external threat detection system, a number or set of names of other detectors that alerted on the same threat, whether the same attack has previously caused an alert or is known, whether a URL, IP address, or Hash value for the attack has been seen before, a total number of malicious URLs associated with the attack, a total number of malicious files associated with the attack, a geo-location value associated with the attack, and indicators of whether files and/or URLs involved in the attack have been seen before.

In an embodiment, machine table 312 comprises data relating to a host computer that is the subject of an attack or alert.

Example information includes machine name, which may be a symbolic name, path name, IP address or MAC address, operating system version, network domain, number of critical, high and low patches that are needed and not yet installed, whether AV software is installed, whether AV software is running, version number of anti-virus definition files associated with the AV software, etc. In an embodiment, machine table 312 also includes a host value indicator 320 that specifies whether the host computer is a valuable computer, a critical machine, or other metric associated with tangible or intangible value or worth to an organization that owns or operates the host. A critical machine, in this context, is a machine that has significance, value, importance, or business criticality. The value shown for host value indicator 320 may affect the threat score shown using threat score indicator 304 and may affect the remediation actions that are taken.

In an embodiment, map 314 is a geographical map or map region that indicates an approximate location associated with the attack.

In an embodiment, recommendation region 316 indicates an action that will be taken automatically, or is suggested to be taken, in response to all the data otherwise shown in FIG. 3. In the example of FIG. 3, the action is Reimage, which is consistent with a score of "100" as shown using threat score indicator 304.

Using the techniques disclosed herein, integration of diverse third-party tools and automated steps to evaluate data from multiple systems and respond to detected threats may provide significant reduction in response time to attacks or vulnerable threats. The techniques provide a consistent method of evaluation, facilitate comparing all data that is received from the third-party tools, and enable blending a user value score, machine value score, and threat information for scoring. In particular, the use of a perceived worth or value of a machine and/or user may provide significant insight and context into the proper response to a particular attack.

Implementation Example

Hardware Overview

Figure 4:
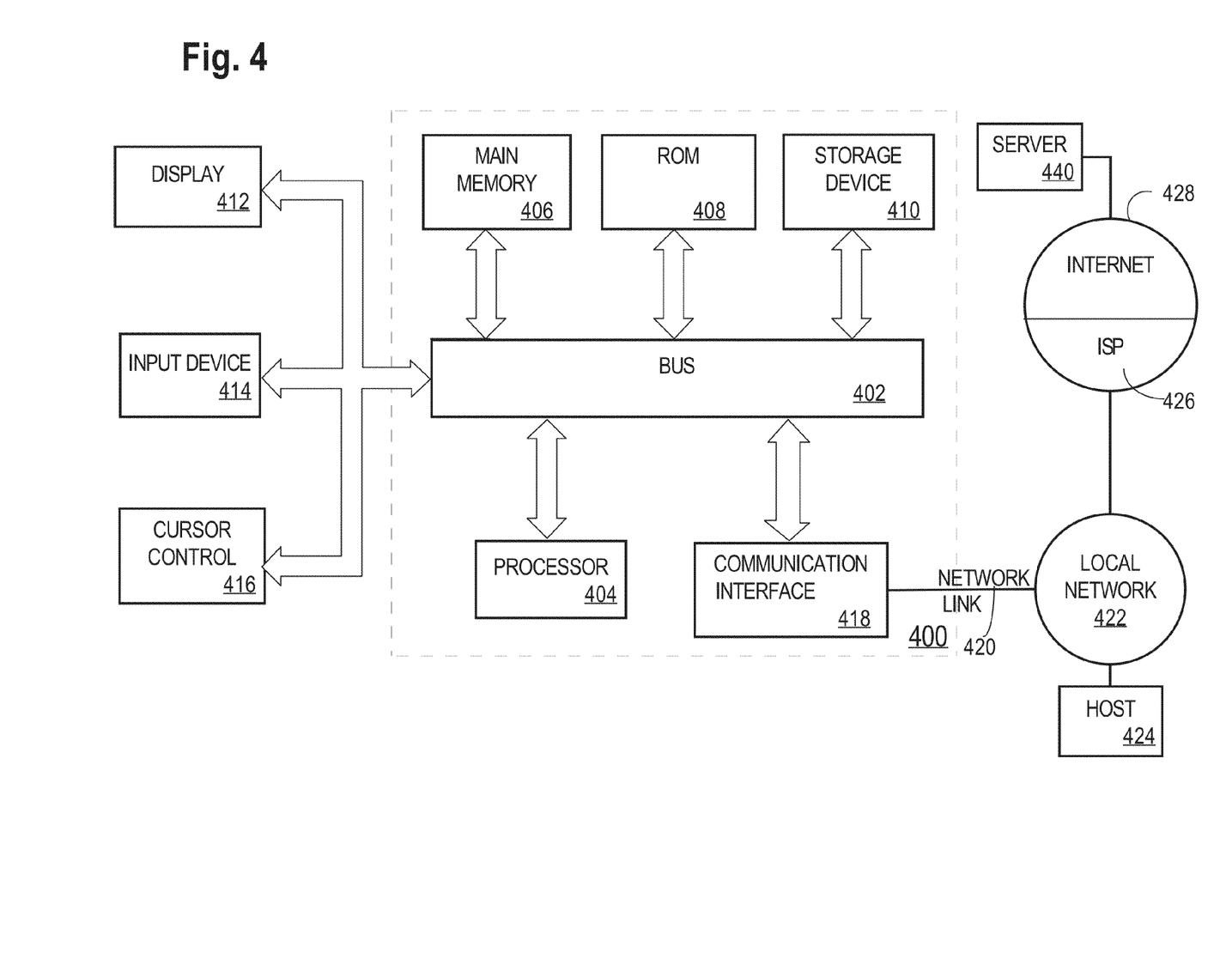
FIG. 4 illustrates a computer system with which an embodiment may be used.

FIG. 4 illustrates a computer system with which an embodiment may be used. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and convert the data to a format that can be received using an interface at the computer. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
   obtaining a plurality of computer network security threat feeds from two or more computer threat detection systems, and in response, updating a threat score that represents a severity of an actual or suspected attack on a particular host computer of a computer network, based upon computer network attack information in the computer network security threat feeds;
   determining a number of other detectors that have generated alerts for the same actual or suspected attack on the particular host, and in response, updating the threat score based upon the number;
   obtaining one or more attacker data values relating to an attacker involved in the same actual or suspected attack on the particular host, and in response, updating the threat score based upon the attacker data values;
   determining whether a universal resource locator (URL), network address, or hash value associated with the actual or suspected attack have been previously processed, and updating the threat score based upon whether the URL, network address, or hash value have been previously processed;
   determining all of a user posture, a machine posture, and an attacker posture, wherein the user posture includes at least a title or position in an organization of a user associated with the particular host, wherein the machine posture is based at least in part upon a number of uninstalled patches and whether the particular host is a critical machine, and updating the threat score based upon the user posture, machine posture and attacker posture;
   obtaining an asset value for the particular host that indicates a worth of the particular host, and updating the threat score based upon the asset value;
   mapping the updated threat score to one of a plurality of remediation actions, wherein a first remediation action is mapped when the updated threat score is low and a second, different remediation action is mapped when the updated threat score is high;
   wherein each of the steps of updating the threat score based upon the asset value comprises determining a different individual threat score for that step, the method further comprising determining the updated threat score for the particular host by contributions of the different individual threat scores based upon different specified percentages;
   based upon the updated threat score and the mapping, selecting and automatically performing one of the plurality of remediation actions on the particular host;
   wherein the method is performed by one or more special-purpose computing devices.

2. The method of claim 1 wherein the attacker posture is based at least in part upon whether the process has previously processed one or more alerts associated with the same attacker attacking the same particular host.

3. The method of claim 1 wherein the asset value indicates that the particular host is a critical machine.

4. The method of claim 1 wherein the plurality of remediation actions include: disabling a network interface card (NIC) of the particular host; automatically initiating a software reimaging operation on the particular host; disabling a virtual private network (VPN) tunnel, VPN configuration, or VPN client program on the particular host; revoking a DHCP lease of an IP address to the particular host; blacklisting, at a DHCP server that the particular host uses, an unknown or malicious MAC address; and deleting, on the particular host, one or more executable files that triggered an alert but have not been executed by the particular host.

5. The method of claim 1 wherein the plurality of remediation actions include one or more of: disabling a network interface card (NIC) of the particular host; automatically initiating a software reimaging operation on the particular host; disabling a virtual private network (VPN) tunnel, VPN configuration, or VPN client program on the particular host; revoking a DHCP lease of an IP address to the particular host; blacklisting, at a DHCP server that the particular host uses, an unknown or malicious MAC address; deleting, on the particular host, one or more executable files that triggered an alert but have not been executed by the particular host.

6. The method of claim 1 wherein the two or more computer threat detection systems are different commercially available computer network security threat detection systems each implementing a different messaging protocol or application programming interface (API).

7. The method of claim 1 comprising creating and storing a report identifying the updated threat score, asset value, and the plurality of remediation actions associated with the particular host.

8. A network security computer comprising:
a threat system interface unit configured to communicate with two or more computer threat detection systems and configured to obtain a plurality of computer network security threat feeds from the two or more computer threat detection systems for one or more host computers in a computer network;
an attack assessment unit coupled to a threat scoring unit and configured to obtain one or more attacker data values relating to an attacker involved in an actual or suspected attack on a particular host in the computer network;
an environment assessment unit coupled to the threat scoring unit and configured to obtain one or more of a user posture and machine posture associated with the particular host;
a remediation unit coupled to the threat scoring unit and configured to automatically perform one or more among a plurality of remediation actions on the particular host in response to instructions from the threat scoring unit;
wherein the threat scoring unit comprises a non-transitory data storage device storing one or more sequences of computer instructions which, when executed using the network security computer, cause performing:
based upon computer network attack information in the computer network security threat feeds, determining a threat score that represents a severity of an actual or suspected attack on a particular host in a computer network;
obtaining a plurality of computer network security threat feeds from two or more computer threat detection systems, and in response, updating a threat score that represents a severity of an actual or suspected attack on the particular host, based upon computer network attack information in the computer network security threat feeds;
determining a number of other detectors that have generated alerts for the same actual or suspected attack on the particular host, and in response, updating the threat score based upon the number;
obtaining one or more attacker data values relating to an attacker involved in the same actual or suspected attack on the particular host, and in response, updating the threat score based upon the attacker data values;
determining whether a universal resource locator (URL), network address, or hash value associated with the actual or suspected attack have been previously processed, and updating the threat score based upon whether the URL, network address, or hash value have been previously processed;
determining an attacker posture, and wherein the user posture includes at least a title or position in an organization of a user associated with the particular host, wherein the machine posture is based at least in part upon a number of uninstalled patches and whether the particular host is a critical machine, and updating the threat score based upon the user posture, machine posture and attacker posture;
obtaining an asset value for the particular host that indicates a worth of the particular host, and updating the threat score based upon the asset value;
wherein each of the steps of updating the threat score based upon the asset value comprises determining a different individual threat score for that step, the method further comprising determining the updated threat score by contributions of the different individual threat scores based upon different specified percentages;
mapping the updated threat score to one of the plurality of remediation actions, wherein a first remediation action is mapped when the updated threat score is low and a second, different remediation action is mapped when the updated threat score is high;
based upon the updated threat score and the mapping, selecting and automatically performing one of the plurality of remediation actions on the particular host.

9. The network security computer of claim 8 wherein the attacker posture is based at least in part upon whether the process has previously processed one or more alerts associated with the same attacker attacking the same particular host.

10. The network security computer of claim 8 wherein the asset value indicates that the particular host is a critical machine.

11. The network security computer of claim 8 wherein the plurality of remediation actions include: disabling a network interface card (NIC) of the particular host; automatically initiating a software reimaging operation on the particular host; disabling a virtual private network (VPN) tunnel, VPN configuration, or VPN client program on the particular host; revoking a DHCP lease of an IP address to the particular host; blacklisting, at a DHCP server that the particular host uses, an unknown or malicious MAC address; and deleting, on the particular host, one or more executable files that triggered an alert but have not been executed by the particular host.

12. The network security computer of claim 8 wherein the plurality of remediation actions include one or more of: disabling a network interface card (NIC) of the particular host; automatically initiating a software reimaging operation on the particular host; disabling a virtual private network (VPN) tunnel, VPN configuration, or VPN client program on the particular host; revoking a DHCP lease of an IP address to the particular host; blacklisting, at a DHCP server that the particular host uses, an unknown or malicious MAC address; deleting, on the particular host, one or more executable files that triggered an alert but have not been executed by the particular host.

13. The network security computer of claim 8 wherein the two or more computer threat detection systems are different available computer network security threat detection systems each implementing a different messaging protocol or application programming interface (API).

* * * * *